Figure 1:
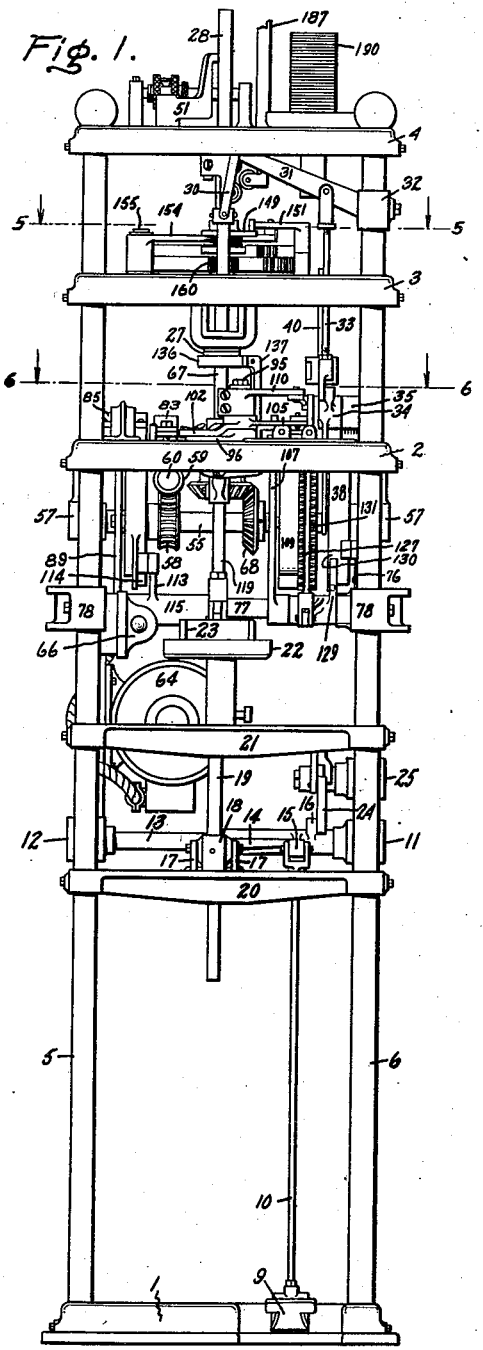

June 20, 1939.  J. H. RAMSEY  2,162,745
METHOD FOR CAPPING BOTTLES OR THE LIKE AND MACHINE FOR EFFECTING THE SAME
Filed July 25, 1935    7 Sheets-Sheet 1

Inventor:
Joseph H. Ramsey,
by John G. Sbarbaro
His Attorney.

Inventor:
Joseph H. Ramsey.
by John G. Sbarbaro
His Attorney

Inventor:
Joseph H. Ramsey,
by John G. Sbarbaro
His Attorney.

June 20, 1939. J. H. RAMSEY 2,162,745
METHOD FOR CAPPING BOTTLES OR THE LIKE AND MACHINE FOR EFFECTING THE SAME
Filed July 25, 1935 7 Sheets-Sheet 5
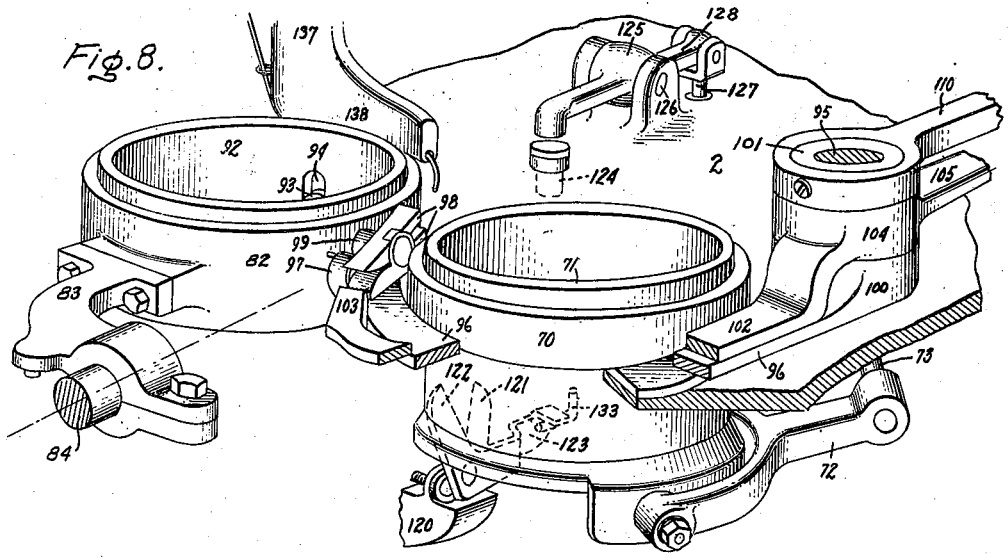
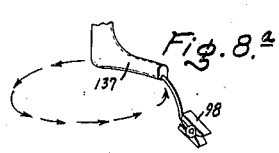
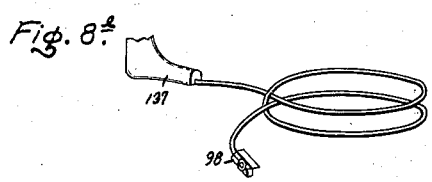
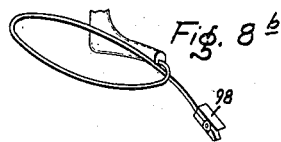
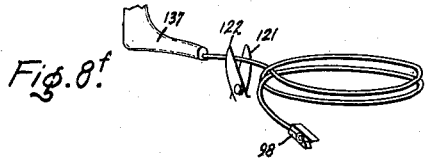
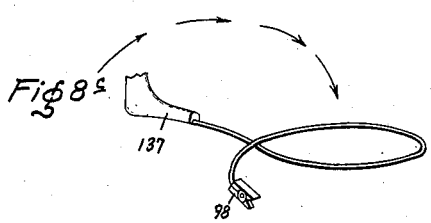
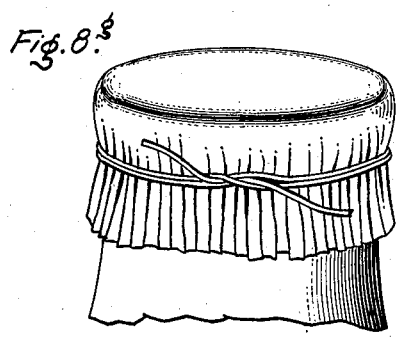
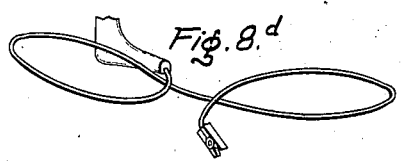
Inventor:
Joseph H. Ramsey,
by John G. Sbarbaro
His Attorney.

June 20, 1939. J. H. RAMSEY 2,162,745
METHOD FOR CAPPING BOTTLES OR THE LIKE AND MACHINE FOR EFFECTING THE SAME
Filed July 25, 1935 7 Sheets-Sheet 6
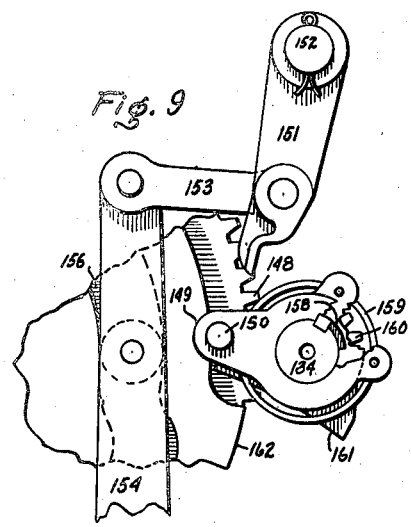
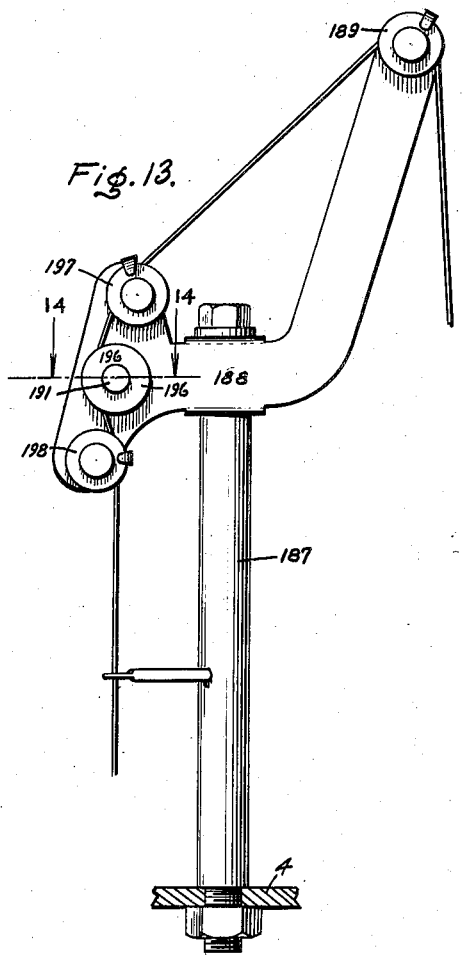
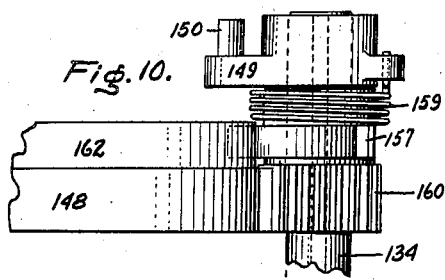
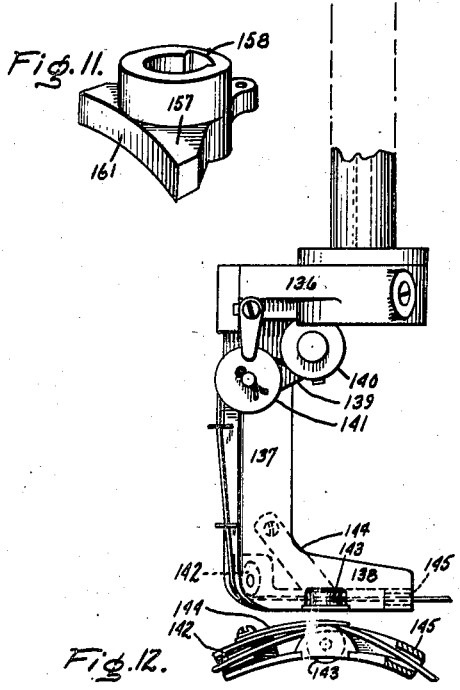
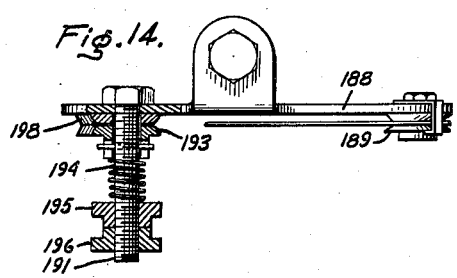
Inventor:
Joseph H. Ramsey.
by John G. Sbarbaro
His Attorney.

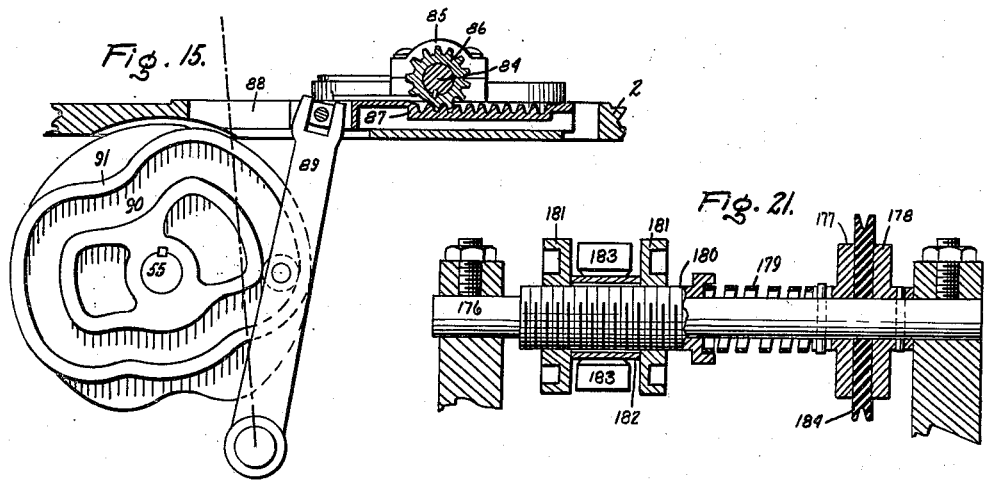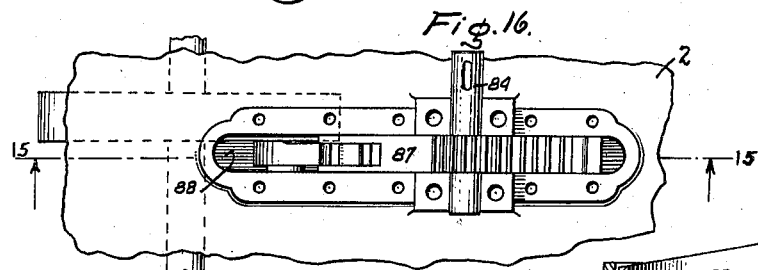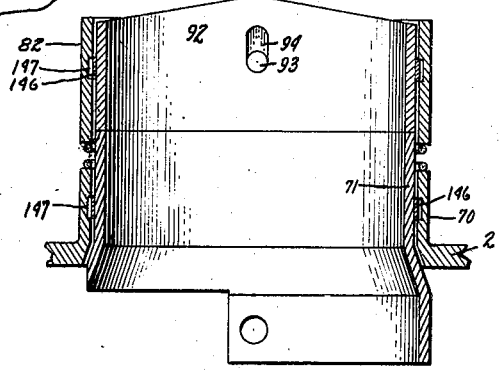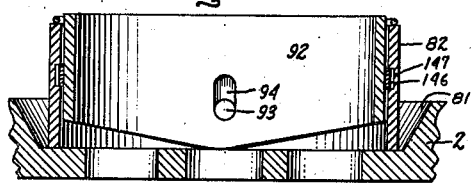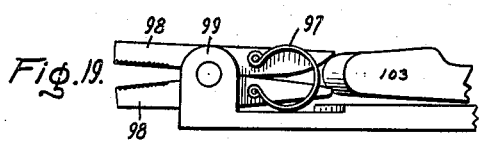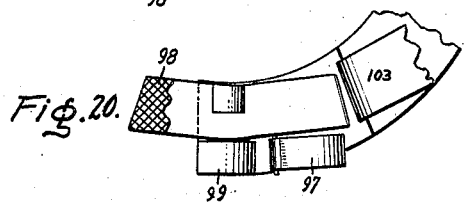

Patented June 20, 1939

2,162,745

UNITED STATES PATENT OFFICE 2,162,745

METHOD FOR CAPPING BOTTLES OR THE LIKE AND MACHINE FOR EFFECTING THE SAME

Joseph H. Ramsey, Albany, N. Y.

Application July 25, 1935, Serial No. 33,154

31 Claims. (Cl. 226—80)

My invention relates to a new and improved method of securing protective skirted paper or tissue caps upon the mouth portions of bottles, containers and the like and more particularly upon the mouth portions of milk bottles which, because of the large quantities in daily use, provide a wide field of usefulness for my improvements. In my United States Patent No. 2,005,753 I disclose a method for sealing receptacles which consists in placing a skirted hood cap upon the mouth portion of a receptacle, placing in the form of a clove hitch loops of twine treated with a gummy material upon and around the skirt portion of the cap, and exerting a pulling force upon the ends of the twine to cause the loops to contract upon and around the skirted cap and thus to contract and co-incidently secure the skirt of the cap upon and around the mouth portion of the receptacle. My present invention relates to a mechanical method for placing the loops of twine upon the skirt of the hook cap and for securing the cap tightly into operative position upon the mouth portion of the receptacle by the application of pull to the ends of the twine and to apparatus for putting this mechanical method into practice.

The method by which I accomplish this result consists in pre-forming loops of twine preferably in the form of a clove hitch, the loops being supported by mechanical means in such manner that the mouth portion of a bottle upon which the hood cap has been previously placed may be inserted within the pre-formed loops of twine, after which the supporting means for the loops is withdrawn and pull is exerted upon either or both ends of the twine as desired, thus causing the loops to contract tightly upon the skirt portion of the cap to retain it snugly in its operative position upon the mouth portion of the bottle.

In the development of this method I provide a machine which has marked advantages over any device heretofore existent in this field, since I avoid the delay caused by forming the loops about the mouth portion of the bottle after it has been inserted in loop-forming mechanism as has heretofore been customary in machines of this type. In the device which I disclose herein the machine automatically pre-forms the loops in the form of a clove hitch, retains a hold on both ends of the twine and then stops. The bottle with the hood cap thereon is inserted in the machine and is elevated by mechanism operated by a pedal lever so as to force the mouth portion of the bottle with its hood cap within the pre-formed clove hitch, the ends of the twine are pulled taut to secure the cap, the twine is severed, and the bottle is thereupon immediately forced downward and removed from the machine, which then proceeds to pre-form a new clove hitch for the succeeding bottle and, when this has been done, comes to rest. It will be apparent that a machine wherein this method is embodied will be very fast in its operation because the loops are being formed during the time when the previously tied bottle is being removed and the next bottle with its cap is being introduced. In fact, the capacity of my machine is nearly double that of a machine wherein the loops of twine are formed directly about the mouth portion of the bottle.

My invention is illustrated and described herein merely for the purposes of disclosure and it is apparent that my general method of pre-forming the loops may be applicable to other types of containers or objects having flexible walls than bottle caps. Instead of being used to constrict the skirt portions of the hood caps, the same method may be used for constricting the mouth portion of bags, paper containers and the like. In the case of skirted hood caps the machine may pre-form and place the loops of twine upon the skirt of a cap before the mouth portion of the bottle is inserted therein and yet come within the scope of my invention. The means which I show herein for forming and supporting the loops are merely one illustration of many which may be available for the stated purposes and the simple form of the completely assembled machine as depicted herein is merely illustrative of the general principle of my invention which may be incorporated in rotary or multiple head types where large production speed is desired. By the application of this principle a machine is provided singularly free from small, complicated or fragile parts; this is extremely important because experienced mechanics are not regularly available in milk bottling plants so that a machine to be commercially practicable must give uninterrupted service with a minimum of attention.

The invention has other advantages and characteristics which will be apparent by reference to the accompanying drawings which show the embodiment of the basic tying principle as it is incorporated in a single-unit machine.

Figure 2:
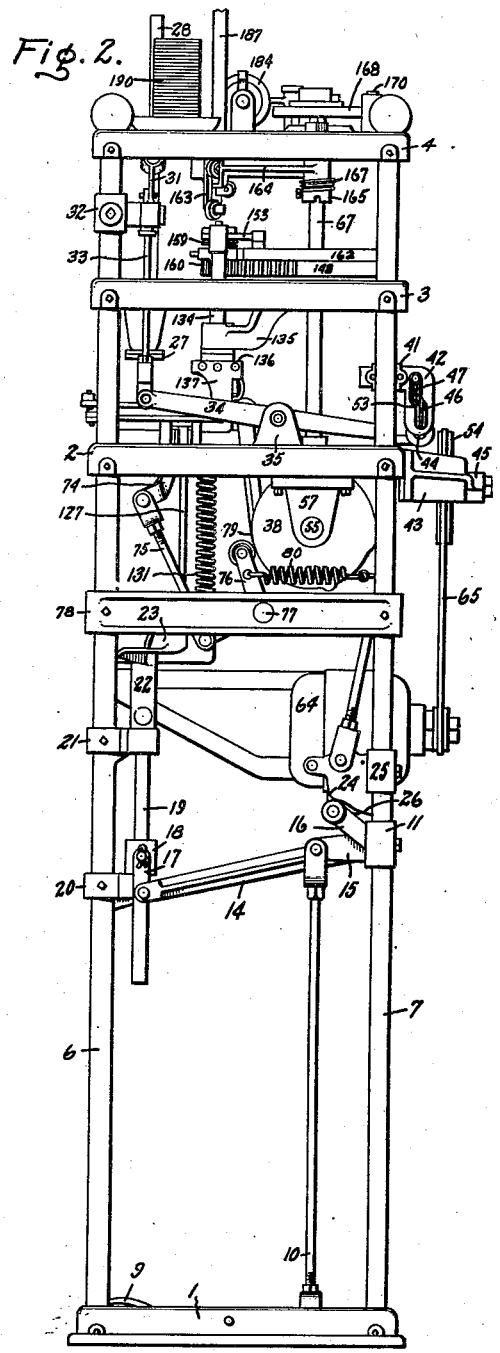
Figure 3:
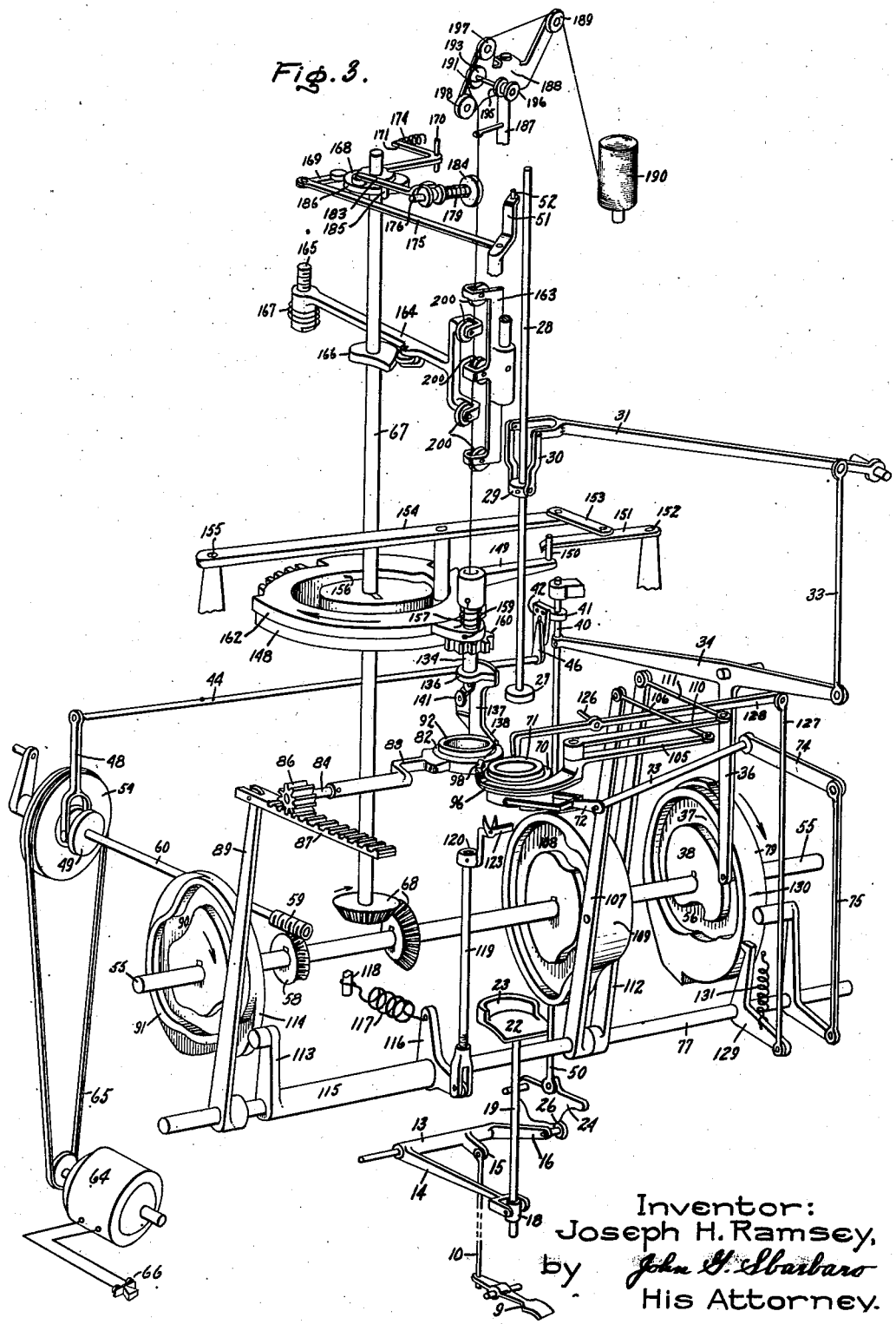
Figure 4:
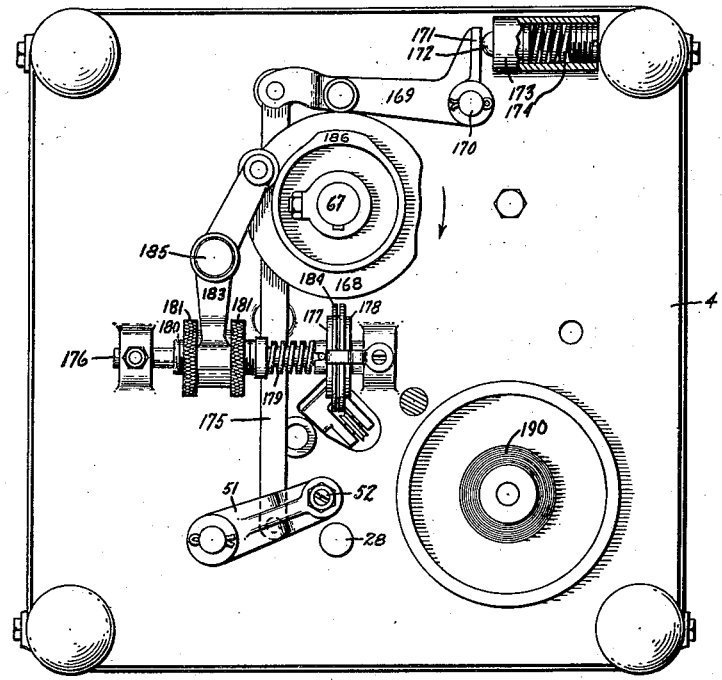
Figure 5:
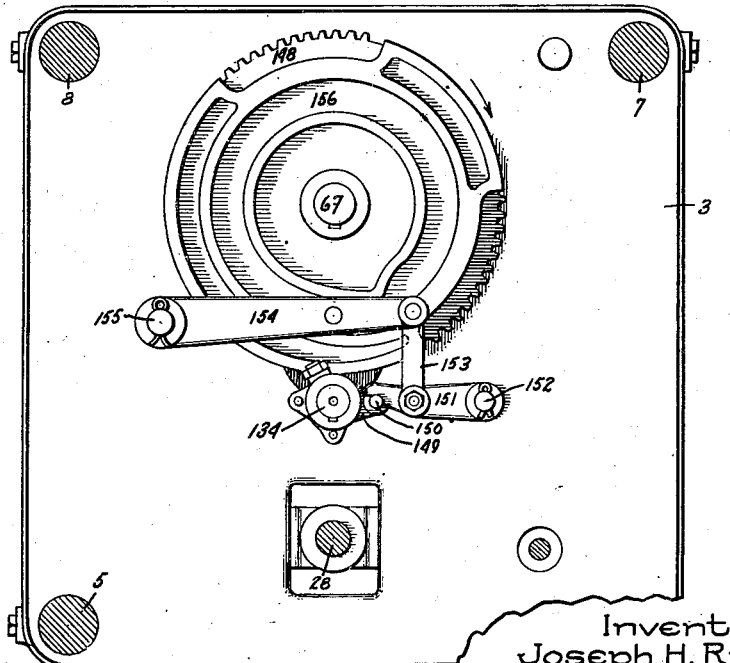
Figure 6:
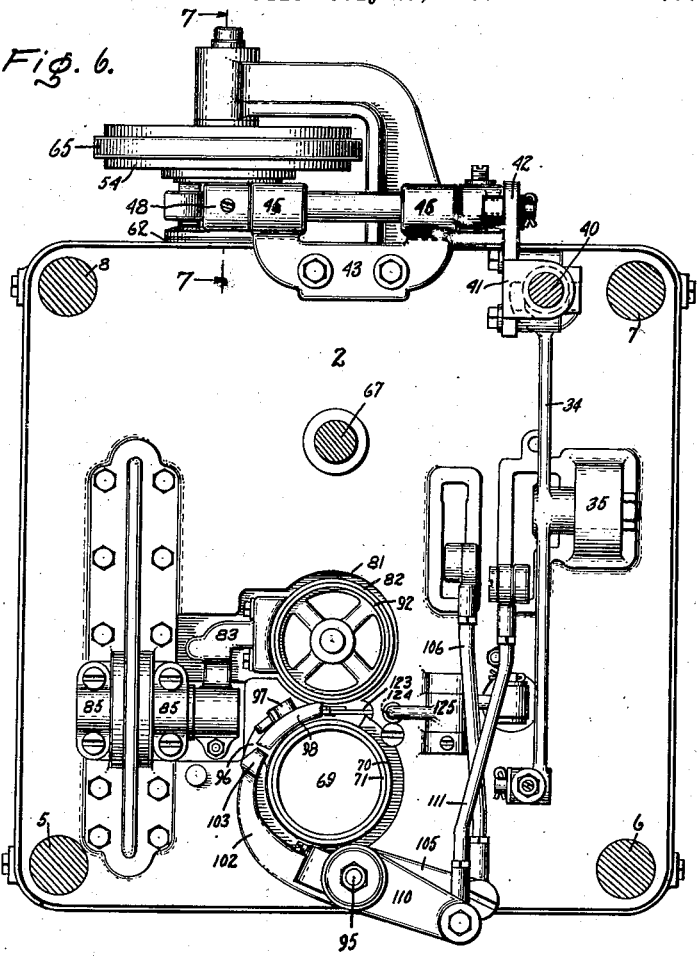
Figure 7:
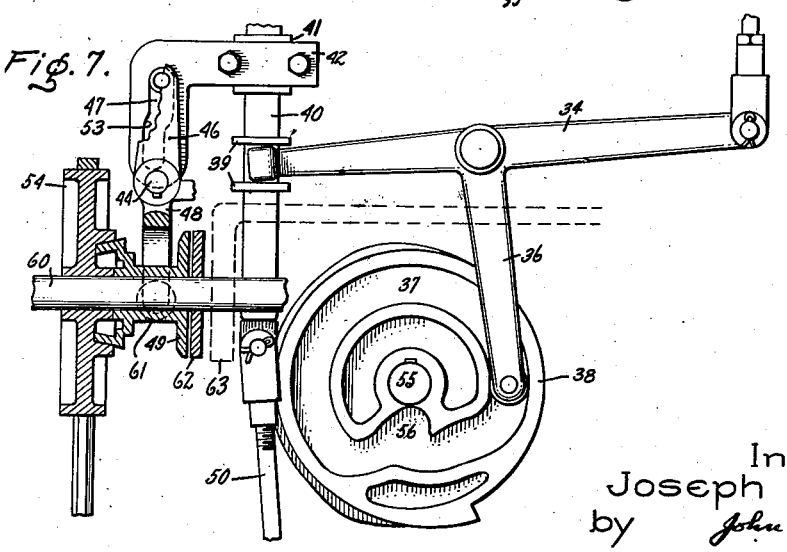

The method and structure of my invention will be more fully explained in connection with the accompanying drawings in which Fig. 1 is a front view of the machine described herein; Fig. 2 is a side view of the machine; Fig. 3 is a perspective view showing the various mechanical elements incorporated in the machine and is in extended scale so that parts may be seen that would otherwise be hidden from sight, the supporting means for the elements not being shown for the same reason; Fig. 4 is a top view in which a mechanism for supporting the twine is not shown for simplification; Fig. 5 is a horizontal sectional view taken as indicated by the arrows at line 5—5 in Fig. 1; Fig. 6 is a horizontal sectional view taken as indicated by the arrows at line 6—6 in Fig. 1; Fig. 7 is a vertical sectional view, taken as indicated by the arrows at line 7—7 in Fig. 6, of the clutch pulley and operating mechanism; Fig. 8 is a perspective view of the loop forming and tying mechanism; Figs. 8a–8g show in perspective the various stages in the formation of the clove hitch and its final assembled position upon the skirt portion of the hood cap; Fig. 9 is a plan view of a portion of the mechanism for forming the loops; Fig. 10 is a vertical view of a portion of the mechanism for forming the loops; Fig. 11 is a perspective view of a lock-plate used in the loop-forming mechanism; Fig. 12 is a view of the under face of a portion of the loop-forming mechanism; Fig. 13 is a view in perspective of the mechanism which supports the twine and which for reasons of clearness of disclosure is not shown in Figs. 1, 2 and 4; Fig. 14 is a horizontal sectional view taken as indicated by the arrows at line 14—14 in Fig. 13; Fig. 15 is a vertical sectional view, taken as indicated by the arrows at line 15—15 in Fig. 16, of a portion of the loop transfer mechanism; Fig. 16 is a plan view of the aforementioned portion of the loop transfer mechanism; Fig. 17 is a vertical sectional view of the loop supporting mechanism; Fig. 18 is a vertical sectional view of the loop transfer mechanism and also shows the loop sustaining mechanism in cooperating position therewith; Fig. 19 is a side view in perspective of jaws for engaging the end of the twine; Fig. 20 is a plan view of the aforementioned jaws; and Fig. 21 is a vertical sectional view of a tension device for regulating the pulling force upon the twine when the loops are constricted upon the skirt of the hood cap.

Briefly, my machine consists of a pedal base 1, immediately above which is located the mechanism for elevating the mouth portion of the bottle into and within an opening in a tying base 2, which supports the mechanism for transferring loops, and for supporting the bottle in such manner as will enable its mouth portion with the hood cap thereon to be introduced within the circumferential area of the loops. Base 2 also supports the driving mechanism comprising primarily a horizontal cam shaft by means of which the various machine elements on base 2 are operated as and when desired. Immediately above base 2 and in spaced relationship therewith is looper base 3 upon which is located the mechanism for forming the loops, as and when desired, upon supporting means for the loops which are incorporated in the mechanism upon base 2. Above base 3 and in spaced relationship thereto is positioned a tension base 4 which supports a spool of twine, means for applying tension to the twine as and when required and means for pulling the loops of twine taut upon the skirt portion of the hood cap when and as required. Power for driving the various mechanisms on bases 3 and 4 is derived from a vertical cam shaft which is driven by a horizontal cam shaft beneath base 2. As shown, the four bases are rectangular in form with flanged edges and are supported vertically in spaced relationship one to the other by four vertical rods, one at each corner.

Referring to Figs. 1, 2 and 3, base 1 consists of a plate at the corners of which are mounted vertical supporting rods 5, 6, 7 and 8 and which has a depression cast therein or otherwise formed and in which is pivotally mounted a pedal lever 9 fulcrumed at its center and having a foot plate at one end and an eye at the other. Pivotally attached to the eye of the pedal lever and arising vertically therefrom is a link rod 10. Directly above the rear of base 1 and fixed to rods 3 and 4 are brackets 11 and 12 which support between them horizontal rod 13 which acts as a fulcrum for the elevating arm 14. Formed integrally upon the hub of arm 14 is an extending arm 15 to which is pivotally connected the upper end of the vertical link rod 10. Another extending arm 16 having a cam roller mounted upon its end is also formed integrally upon the hub portion of elevating arm 14. The forward end of elevating arm 14 is provided with a yoke at the ends of which are pivotally attached connecting links 17, the upper ends of which are in turn pivotally attached to block 18 which is pinned to the vertical rod 19 which is slidably mounted in the brackets 20 and 21. Upon the upper end of rod 19 is affixed a stool 22 which has a semi-circular rib 23 upon its upper surface for retaining the bottom portion of a milk bottle substantially in vertical registration with the aforementioned circular aperture in base 2. By the means thus described it will be noted that a downward movement of the foot plate will force the link rod 19 upward, which movement will be transmitted through arm 14, block 18, links 17 and rod 19 to the stool. For milk bottles the approximate up and down movement of the stool is 2½ inches.

It will be noted from the foregoing that a bottle placed upon the stool may be raised by foot pressure upon the pedal plate until the mouth portion of the bottle is in tying position.

As hereinafter noted, it is necessary in the operation of the machine to force the bottle downward and out of its tying position as soon as the tying operation has been completed. To obtain this result it will be noted that, as the bottle is elevated, the cam roller on arm 16 will move towards the face of segmental cam 24 which is pivotally mounted on bracket 25 fixed to supporting rod 7 and when the bottle is finally in tying position the roller will bear against the face of cam 24. As soon as the tying operation is completed, the cam will be rotated downward as hereinafter explained until the projecting portion 26 of the cam face has forced the roller downward, which motion is transmitted through the arms 16 and 14 to the rod and stool.

It is desirable to compress the hood cap firmly down upon the mouth portion of the bottle at the time when the loops are contracted into their assembled position upon the skirt of the cap, as otherwise the cap would be apt to pucker and be unsightly in appearance. To attain this, I provide a horizontal disc 27, the diameter of which is about equal to that of the mouth portion of the bottle, and this is fixed upon the lower end of plunger rod 28 which is slidably supported in bearing apertures in bases 3 and 4. Upon the plunger rod 28 is fixed a block 29 to which the links 30 are pivotally secured at their lower ends, their upper ends being pivotally attached to a yoke upon the extending end of lever 31, which lever is fulcrumed on bracket 32 fixed on rod 6.

The lever 31 is oscillated by the connecting rod 33 pivotally attached to rocker arm 34. This rocker arm is fulcrumed upon boss 35 and has a central arm 36 protruding downwardly through an aperture in base 2. Upon the lower end of arm 36 is mounted a cam roller which operates in a side groove 37 in cam 38. The rearwardly extending portion of rocker arm 34 is formed with a yoke end which engages block 39 pinned to the vertical rod 40 mounted in bearing apertures which are provided in bases 2 and 3. A block 41 is mounted on rod 40 and is grooved to fit the forwardly extending arm portion of cam plate 42. Mounted upon the rear surface of base 2 is bearing plate 43 supporting rocker shaft 44 in bearings 45, this shaft having upon one end an upwardly extending lever arm 46 terminating in a roller which operates within groove 47 of cam plate 42. Upon the other end of the rocker shaft 44 is a downwardly projecting yoke 48 which has rollers attached to its ends and which operates a clutch member 49. The lower end of rod 40 is pivotally connected to the segmental cam 24 by link rod 50. When the machine is in idle position, plunger rod 28 with its disc 27 is at its lowest position at which the bottom of the disc slightly more than clears the bottom edge of the flange on base 2. When a milk bottle with a hood cap upon its mouth portion is placed upon the stool and the pedal lever is operated, the bottle will be lifted upward until the hood cap engages the bottom surface of the disc, thus holding the hood cap securely in place, while further lifting of the bottle causes the mouth portion to enter the aperture provided in base 2 until it has reached the correct elevation for performance of the tying operation. In order that the bottle may be stopped definitely when it has been elevated to the exact position required for the tying operation, I provide a swinging arm 51 atop base 4, the same being pivoted to base 4 and having an upwardly and outwardly extending arm section terminating in the adjusting screw 52. The normal position for the lower end of this screw is directly over the center of plunger rod 28 but for reasons which will be explained hereafter it is necessary to raise plunger rod 28 still further after the tying operation has been completed and, in order that the swinging bracket will not interfere with this movement, provision has been made to swing the adjusting screw 52 clear of the end of the rod 28 when and as required. As the bottle is pushed upward, after its top has engaged disc 27 on plunger rod 28, this upward movement of the rod is transmitted through lever 31, rocker arm 34 and block 39 to effect a downward movement of rod 40 and, through link 50, of segmental cam 24. During this movement the jog 53 in the groove 47 in the cam plate 42 will engage the cam roller at the upper end of arm 46 and thence cause a pivotal movement of the rocker shaft 44 which causes the clutch member 49 to engage the pulley 54 and start the main cam shaft 55 underneath base 2 in rotation. This same downward movement of rod 40 is transmitted through link rod 50 to segmental cam 24 and when projecting portion 26 on the face of the cam comes into contact with the roller on arm 16, which contact occurs just after the tying operation has been completed, arm 14 will be forced downwardly, thus causing the bottle to be withdrawn from its tying position. It will be remembered that while the bottle to be tied is being elevated into its tying position the machine is at rest and clearance 56 is provided in the groove 37 in cam 38 for the roller on arm 36 during this portion of the vertical travel of plunger rod 28. This portion of the travel has, however, started the cam 38 in rotary motion and the slot 37 for the roller on arm 36 is so conformed as to maintain the plunger rod 28 in the bearing position of the disc upon the cap during the time that the tying operation is being completed. As soon as the tying is completed and simultaneously with the downward movement of the bottle, plunger rod 28 is elevated by a suitable conformation of the groove 37 in cam 38 until the rod comes to rest in its extreme upward position where it is maintained by the conformation of the groove until the next series of loops has been completed, after which the plunger slides downward until the disc 27 is again at its normal starting position slightly beneath the edge of the flange of base 2. It will be noted that this downward action of the plunger rod 28 has caused rod 40 to move upward, carrying with it cam plate 42, and the same jog 53 which threw the clutch member into engagement on its downward travel now throws the clutch member out of engagement and the machine comes to rest after having made one complete revolution of the cam shaft.

Instead of the clutch and its operation to start and stop the machine, a conveyor or other feeding device may be used to feed and remove caps and bottles in connection with the loop forming apparatus, the feeding device being timed to act in unison with the loop forming apparatus.

As previously mentioned, the mechanism for applying the twine in the form of loops upon the skirt portion of the hood cap is positioned on base 2 and is operated by a series of cams mounted upon shaft 55 supported at either end by bearing members 57 which are affixed to the underneath outer flanged edges of base 2. This cam shaft is rotated by worm wheel 58 which is driven by worm 59 on a drive shaft 60 supported by bearings on base 2. A clutch pulley 54 is rotatable upon drive shaft 60 and the hub of the pulley comprises the cup portion of a cone clutch, the cone portion being formed on clutch member 49 which is splined to the drive shaft and has an annular groove 61, the sides of which bear upon the faces of the rollers mounted upon the ends of yoke 48. Opposite its cone end the clutch member 49 has a circular face for engagement with fibre disc 62. Formed integrally upon the rear flange of base 2 is a downwardly projecting lug 63 having a face which cooperates with the adjacent face of the fibre disc 62. It will be seen that as the clutch member 49 is forced into frictional engagement with the clutch pulley the drive shaft 60 will rotate therewith. When the clutch member is withdrawn from the clutch pulley the fibre disc 62 will be compressed between the circular faces of the clutch member 49 and lug 63. This structure acts as a brake to prevent any spinning action of the drive shaft after the clutch has been disengaged. The clutch pulley is in constant rotation, being driven by a motor 64 and belt 65. A switch 66 of standard type is conveniently located at the front of the machine for the starting and stopping of the motor. A vertical cam shaft 67 for furnishing power to the mechanism located on bases 3 and 4 is driven from cam shaft 55 by means of a pair of mitre gears 68.

In the front portion of base 2 there is provided a substantially circular aperture 69 which is counter-bored to retain a fixed stripper sleeve 70 within which is slidably mounted a funnel shaped transfer member or sleeve 71 pivotally supported at its lower end by the yoke ends of rocker arm 75

72 fulcrumed to the base 2 by rocker shaft 73, which is oscillated as and when required by the arm 74 affixed to the shaft 73. The extending end of the arm 74 is pivotally connected to link rod 75 which in turn is pivotally connected to follower arm 76 which is adapted to rock upon a shaft 77 supported in fixed relation to the cam shaft 55 by the bearing plates 78 upon the vertical supporting rods. Follower arm 76 has an extension for supporting a cam roller for engagement with cam surface 79. The inside diameter of the upper portion of the transfer sleeve 71 is sufficient to accommodate the mouth portion of the milk bottle with the hood cap assembled thereon. The lower inside diameter is sufficient to clear the neck portion of the bottle. The center of the transfer sleeve is directly above the center of rod 19. The roller on arm 76 is held in constant engagement with the cam surface 79 by means of the tension spring 80 and through the arrangement of links and arms set forth the cam surface 79 may be so formed as to elevate or lower the transfer sleeve 71 as and when required. Directly in the rear of circular aperture 69 and formed integrally in the surface of the base 2 is a substantially circular depression 81 to accommodate the stripper ring 82 which has upon its outer edge a boss which is affixed to carrier arm 83, the hub of which is keyed to pinion shaft 84 mounted in the bearings 85 which are formed integrally upon the upper surface of base 2. The pinion 86 on shaft 84 engages with a sliding rack 87 which is confined within a groove 88 in base 2 and has a rearwardly extending forked portion for sliding pivotal engagement with the upper end of follower arm 89 mounted upon shaft 77 and having a roller for engagement in a groove 90 in cam 91. The groove 90 is conformed so as to oscillate follower arm 89 and thence through the rack to the pinion shaft rotate the same backwardly or forwardly, as and when required, to the extent of 180°. Slidably mounted within stripper ring 82 is a loop sustaining member or sleeve 92, the lower convex face of which is flush with the bottom edge of stripper ring 82 and the upper face of which extends approximately ⅛ inch above the top edge of the stripper ring. The loop sustaining sleeve 92 is limited in its sliding action within the stripper ring 82 by a stop pin 93 fixed to the inner surface of the stripper ring and protruding into an elongated slot 94 in the loop sustaining sleeve. The normal operating position of the top edge of the transfer sleeve 71 is approximately ⅛ inch above the top edge of the fixed stripper sleeve 70. When the loop sustaining sleeve 92 is resting upon the surface of the depression 81 the top edge of the sustaining sleeve is positioned in the same plane as the top edge of the fixed stripper sleeve 70 and the distance between the centers of the loop sustaining sleeve 92 and the transfer sleeve 71 is sufficient to provide a clearance of approximately ½ inch between adjacent edges of the stripper ring 82 and the fixed stripper sleeve 70. The center of the pinion shaft 84 is in the same plane as the top surfaces of the loop sustaining and transfer sleeves and exactly midway between the centers of the two sleeves. With the arrangement of carrier arm, pinion shaft, rack, follower arm and cam thus described, the stripper ring with its enclosed loop sustaining sleeve may be rotated through an arc of 180° whereupon these two sleeves will be in alignment and their adjacent faces in contact when and as required.

Referring to Fig. 8, in front of and slightly to the right of the fixed stripper sleeve 70 is a vertical pivot stud 95, the lower end of which is fixed in base 2. Rotatably mounted upon this stud is a sickle-shape jaw pull arm 96 having a boss 97 upon its extending end pivotally supporting a pair of jaws 98 having knurled gripping faces for engagement with the end portion of a twine and having rearwardly extending portions to form a V-shape aperture. The jaws 98 are so pivoted that when the angle of the V-shape aperture is increased, the gripping faces for the twine move nearer together. The gripping faces are normally held apart at their outer ends approximately ¼ inch by a C-shape flat spring 99 attached to the sides of the rearwardly extending portions of the jaws by pins. The hub 100 of the jaw pull arm extends upwardly upon the pivot stud 95 in the form of a sleeve 101, the lower part of which serves as a pivotal bearing for another sickle-shape arm 102 having its extending end in the form of a wedge 103 to engage the inner faces of the rearwardly extending portions of the jaws. When the wedge is forced into the V-shape aperture the jaw faces will close upon each other against the action of the C-shape spring and when the wedge is withdrawn the jaw faces will open. The hub 104 of the wedge arm has an extension 105 formed integrally therewith and pivotally connected to one end of a lengthwise adjustable link 106, the other end of which is pivotally connected to the upper end of follower arm 107 which, in turn, is pivotally secured at its lower end upon the shaft 77. The follower arm 107 has a roller for engagement with a groove 108 within the left side of cam 109 (Fig. 3). By the foregoing arrangement the wedge may be pivotally located at any angular position in its plane of rotation as and when required. Upon that portion of the sleeve 101 which extends above the hub 104 of the wedge arm, I provide an extending arm 110 which is keyed upon the outer diameter of the sleeve. The extending end of arm 110 is pivotally attached to one end of a lengthwise adjustable link 111, the opposite end of which is pivotally connected to the upper end of follower arm 112 which in turn is pivotally secured at its lower end upon the shaft 77. The follower arm 112 has a roller for engagement with a groove within the right side of cam 109. By the foregoing arrangement the jaws may be pivotally located at any angular position in the plane of rotation of the jaw arm as and when required. It will be noted that, in any angular position of the jaw pull arm, the relative position between it and the wedge arm will denote whether the jaws are in their open or closed position. A nut and washer upon the upper end of vertical stud 95 retain the wedge and jaw assembly in operating position.

A follower arm 113 is pivotally mounted on shaft 77 and has upon its extending end a cam roller for engagement upon the cam surface 114 on cam 91. This follower arm has an extended hub 115 upon which is formed vertically extending arm 116 for attachment to one end of tension spring 117 which is fastened at its other end to stud 118 secured to base 2. This spring serves to keep the cam roller at all times upon cam surface 114. An extending arm 118 on hub 115 is pivotally connected with the vertical slide rod 119, the upper extending end of which passes through a bearing aperture in the center of the circular depression 81 in base 2. Mounted upon this vertical slide rod is an extending bracket 120 upon which shear blade 121 is affixed. As shown in Fig. 8, a cooperating shear blade 122 is pivotally attached to the fixed shear blade 121 and has an L-shape extending arm 123 adapted to cooperate at its outer end with a sliding pin 124 supported in a bearing aperture in base 2. The upper end of pin 124 is enlarged to prevent the pin from falling through the aperture. The upper face of the enlarged portion of the pin is directly beneath one extending end of a rocker arm 125 which is pivoted upon shaft 126 supported at either end by lugs formed upon the upper surface of base 2. A link rod 127 is pivotally secured to the other extending end 128 of rocker arm 125, extends downward through a clearance opening in base 2 and has its lower end pivotally connected to follower arm 129 which has a hook shape extension for engagement with cam surface 130 on cam 38. The hook shape end is maintained in constant engagement with its cam surface by means of tension spring 131 which is connected to base 2 by means of an eye-rod. I provide a rod 133 affixed to and extending downwardly from base 2 and having an L-shape bend at its lower extremity for engagement with the lower surface of the extending arm 123 of the shear blade 122. The base 2 is provided with a clearance opening between the fixed stripper sleeve 70 and the circular depression 81 to permit the elevation of the shear blades into their cutting position when and as required. When the shear blades are elevated to their open cutting position the vertical pin 124 is engaged at its lower end with the upper surface of the extending arm 123 of the shear blade. When the tappet 125 strikes the pin in this position it will cause the scissors blades to close, one with respect to the other. When the scissors are lowered to their normal out-of-the-way position the right angle end of the rod 133 bearing against the lower surface of the extending arm 123 will cause the scissors blades to open, one with respect to the other. Sufficient frictional resistance is offered by the pivot pin in the scissors ordinarily to maintain the blades in open or closed relationship. By the arrangement which I have just described it will be noted that the scissors may be elevated into their cutting position, the cutting operation performed and the shear blades withdrawn to their normal position beneath the upper surface of base 2, all as and when required.

In my method for making loops of twine in the form of a clove hitch I provide means for forming one loop at a time upon the upwardly extending end of the loop sustaining sleeve 92 when the sleeve is resting face upwards upon the circular depression 81. As shown in Figs. 2 and 10, I accomplish this by providing a tubular pinion shaft 134, the central portion of which rotates in a bearing aperture in base 3 and the lower portion of which rotates in bearing member 135 which is formed integrally with the base 3. Upon the lower extending end portion of the shaft 134 and affixed thereto by a key and set screw is a segmental hub section 136. Extending downwardly from the outer circumference of the segmental hub section 136 I provide a semi-cylindrical looper arm 137 having a curved L-shape lower end 138, which is thus formed to provide a clearance for permitting the stripper ring 82 to rock forward and backward without interference. Mounted on a suitable lug 139 formed integrally on the under side of the segmental hub section 136 are grooved guide pulleys 140 and 141 to control the direction of the twine. Beneath these pulleys there is a groove in the heel of the L-shape section within which is another grooved pulley 142. About half way around the lower face of the L-shape extension and vertically supported thereby is a small grooved roller 143 having a flat spring 144 engaging its outer surface. Beyond this the L-shape extension terminates in the form of an eyelet 145 for the passage of twine.

The center of pinion shaft 134 is in alignment with the center of the loop sustaining sleeve 92 and the inner radius of the looper arm 137 is sufficient to clear the oscillatory path of stripper ring 82. The eyelet rotates in a plane slightly above the upper face of the stripper ring 82.

The normal position of the outer ends of jaws 98 is approximately 30° away from a line common to the centers of the loop sustaining sleeve 92 and the transfer sleeve 71; in this position the jaws provide a clear path for the oscillation of the stripper ring 82. When the eyelet 145 is positioned approximately 30° on the opposite side of the common center line, the form of the looper arm 137 is such as to provide clearance for the stripper ring 82 in its oscillatory movement.

Both the loop sustaining sleeve and transfer sleeve have very free sliding fits within the stripper ring and the stripper sleeve, respectively, to avoid the possibility of gumming or otherwise fouling out and, in order to maintain their correct registration, the loop sustaining sleeve and transfer sleeve are each provided with a circular corrugated ring 146 positioned in an annular groove 147 on the inner surface of the stripper ring and stripper sleeve, respectively, which corrugated rings tend to maintain the loop sustaining sleeve and transfer sleeve in concentric relationship with the stripper ring and stripper sleeve respectively.

For purposes hereinafter mentioned it is necessary to provide intermittent counter-clockwise rotation of the looper arm 137 and, when and as desired, I must provide 30° clockwise rotation of the looper arm away from its aforesaid normal position. To accomplish this series of rotations and to maintain the looper arm in its normal position when it is not in rotation I provide (Fig. 5) an intermittent gear 148 which is keyed to vertical cam shaft 67, the teeth of which gear mesh with the teeth of pinion 160 on shaft 134. By varying the circumferential location and number of teeth in one or more groups on the intermittent gear 148 I can obtain any counter-clockwise rotative or orbital movement of the looper arm 137 when and as desired within the limits required for the operation of my machine. In the machine as shown, referring to Fig. 5, I provide two groups of teeth on the intermittent gear 148 in order to effect the formation of two loops, as hereinafter described.

To provide the required limited clockwise rotative movement of the looper arm, I affix arm 149 upon the upper extending end of pinion shaft 134 having an upwardly projecting pin 150 secured upon its outer end for engagement with the extending end of push-lever 151 which is fulcrumed at 152 to a boss on base 3. One end of a connecting link 153 is pivotally attached near the center of push-lever 151, the other end being pivotally connected to the extending end of follower arm 154, which is fulcrumed at 155 to a boss on base 3 and which has a cam roller mounted on its under side for engagement with cam slot 156 formed in the upper surface of intermittent gear 148. By means of a suitable conformation of cam slot 156 oscillatory movement may be imparted through the aforementioned elements to the contacting end of push lever 151 and thus through arm 149 to pinion shaft 134 so that limited clockwise rotative movement of the looper arm 137 may be obtained when and as desired. By the same combination of elements the contacting end of push lever 151 may be pulled away from, and to clear, the circumferential pathway of pin 150 when counter-clockwise movement of pinion shaft 134 is imparted by the intermittent gear.

In order to maintain the looper arm 137 in its aforesaid normal position when there are no intermittent gear teeth contacting the pinion 160, I provide a lock-plate 157 upon the pinion shaft 134 near and just above its pinion and directly below the hub of arm 149 which is keyed to the end of pinion shaft 134, the key extending downwardly and through a clearance keyway 158 in the hub of the lock plate, and the clearance in the keyway providing for 30° rotative movement of the pinion shaft within the hub of the lock plate against the action of spring 159, one end of which is affixed to the hub of the lock plate and the other end to the hub of arm 149. The lock plate has a concave bearing surface 161 cooperating with a circular bearing surface 162 having a radius equal to the pitch radius of the intermittent gear positioned immediately above the gear teeth and cut away so as to provide a clearance for the rotation of the lock plate at such times as the intermittent gear teeth are in mesh with the pinion 160. The lock plate is thus in engagement with the circular bearing surface when the looper arm 137 is moved clockwise against the action of spring 159. It is out of engagement when the gear teeth and pinion are in mesh and it is in engagement at all other times to maintain the looper arm in its normal position.

Positioned above the center of pinion shaft 134 is a series of five grooved pulleys 200 in staggered alignment, the first, third and fifth of which are mounted in the bracket 163 secured to a stud extending downwardly from the bottom of base 4. The second and fourth grooved pulleys are supported upon the yoke end of follower arm 164, the other end of which is fulcrumed upon the downwardly extending pin 165 which also extends downwardly from the bottom of base 4. Follower arm 164 has a cam roller thereon which bears upon the face of cam 166 on the shaft 67. A spring 167, one end of which is secured to the end of the pin 165 and the other end to the hub of the follower arm 164, keeps this cam roller in contact with the face of the cam 166 at all times. The face of cam 166 is so conformed that, when a length of twine is supported at its upper end and is passed downwardly past the faces of the five grooved pulleys and the cam 166 is rotated, the follower arm 164 is swung outwardly and away from the cam shaft 67 and the second and fourth grooved pulleys form U-shape loops in the twine between the first, third and fifth grooved pulleys. The formation of these loops will draw the lower portion of the twine upwardly and, if the lower end of the twine be restrained as well as the upper end, the formation of these U-shape loops will exert a definite pulling force upon the twine. It is apparent that the conformation of the cam 166 may be such as to cause this pulling force to be exerted as and when required.

As shown in Figs. 3 and 4, I provide, upon the upper end of cam shaft 67 and above base 4, a cam 168 cooperating with which is a roller positioned on follower arm 169 which is pivoted at 170 on a boss formed integrally upon the upper surface of base 4. One end of the follower arm 169 has a rearwardly extending portion 171 engaging the end of a plunger 172 in a cylindrical chamber of boss 173 and having a compression spring 174 for the purpose of maintaining the cam roller in contact with the face portion of cam 168. The other end of the follower arm is pivotally connected by link 175 to swinging arm 51, the function of which has been previously explained. By providing a suitable conformation of the cam 168, the swinging arm 51 may be pivotally positioned within its operative limits when and as required.

Upon the upper surface of base 4 and formed integrally therewith are two bosses which support in fixed position horizontal slide rod 176 having friction discs 177 and 178 mounted thereon, as shown in Figs. 4 and 21. Disc 178 is fixed upon the shaft and disc 177 is splined thereon. A compression spring 179 upon the slide rod 176 has one end in contact with disc 177, the other end being in contact with a freely sliding sleeve 180 mounted upon the rod 176. The outer surface of sleeve 180 is threaded to accommodate the knurled discs 181 which are maintained in fixed relationship upon the sleeve 180 by a spaced sleeve 182 which is slidably mounted upon the outer threaded surface of sleeve 180. That portion of the threaded sleeve 180 which comes in contact with the end of the spring is enlarged and knurled upon the peripheral face of the enlarged portion. The knurled discs 181 have two functions, the first of which is to provide bearing surfaces for the yoke end of follower arm 183, and the second function being to act as jam nuts to maintain their adjusted spaced position upon the threaded surface of sleeve 180. By releasing the strain upon the jam nuts 181 the threaded sleeve 180 may be turned by its enlarged knurled surface relative to the jam nuts and thereby may apply more or less compression to the spring 179 and thence to friction disc 177 as desired. Positioned upon the fixed rod 176 and normally freely rotatable thereon is a grooved pulley 184 which is preferably made of fibre or other light weight material for the reduction of inertia and the groove of which on its front portion is in alignment with the base line of the looper shaft 134. Follower arm 183 is pivoted upon base 2 at 185 and has a rearwardly extending portion upon the end of which is mounted a cam roller engaging cam 186. By the combination of the aforesaid elements more or less pressure may be exerted through the compression spring 179 to the friction disc 177 as and when required.

Fixed to the top of base 4 and extending upwardly therefrom as shown in Fig. 13, a rod 187 is provided and upon the upper end of this rod is mounted a plate 188 which acts as supporting means for the grooved pulley 189 positioned directly above the center of the twine spool 190. Affixed to the plate 188 is a threaded stud 191 which extends perpendicularly from the plate and supports in juxtaposition to the surface of the plate a small circular disc 192 having a slightly convex front surface to cooperate with a similar opposed convex surface of disc 193 splined on the stud 191 as illustrated in Fig. 14. A compression spring 194 is positioned between the disc 193 and adjusting nut 195 which has a cooperating jam nut 196, the center of stud 191 being located directly above the bore of the looper shaft 134. Slightly above and to the right of stud 191 (Fig. 13) is a grooved pulley 197 positioned upon the plate 183, a similar grooved pulley 198 being located below and to the left of the stud.

I will now explain the method of threading the twine within the machine and describe a complete cycle of its operation:

The end of the twine is first passed upwardly and over pulley 189 (Fig. 3), downwardly and over pulley 197, between the convex friction discs 192 and 193 and to the right of pulley 198 (Fig. 3); thence in one or two complete loops around the grooved wheel 184; thence downwardly past the grooved faces of pulleys 200; thence downwardly through the bore of the looper shaft 134; thence under and around the grooved face of pulley 140 and over the grooved face of pulley 141; thence downwardly and around the exposed circumference of grooved pulley 142 in the heel of looper arm 137; thence between tension spring 144 and the outer surface of grooved cylindrical roller 143 on the lower edge of the looper arm extension 138; and thence through the eyelet 145 at the end of the extension, whence it is cut off to provide an extending end about ½ inch long from the face of the eyelet. Suitable guides are provided along the pathway of the twine to retain it in its course.

The machine is now at rest, the plunger rod 28 is in its extreme upward position, the stripper ring 82 with its looper sleeve 92 is at rest in the circular depression 81 and the clutch pulley 54 is engaged. The looper arm 137 and the jaws 98 are in their respective normal position at 30° from the center line between the two sleeves 71 and 92 and fibre wheel 184 is freely rotatable between discs 177 and 178.

The motor is now started. The looper arm with its ½ inch extending twine end portion rotates clockwise towards the jaws and, simultaneously, the jaws in open position move towards the on-coming end of the looper arm until the ends of the jaws meet the end of the looper arm, whereupon the arm dwells momentarily whilst the jaws close upon the extending end of the twine and then back off to their 30° normal position carrying the end of the twine between them. As the jaws thus start back the first group of teeth in the intermittent gear engages the looper shaft pinion and causes the looper arm to make a complete revolution or orbital movement around the upwardly extending portion of the loop sustaining sleeve 92, and thus to deposit a single coil of twine thereon, the looper arm coming to rest at its normal 30° position. Slightly before the looper arm has come to rest the stripper ring 82, with its loop sustaining sleeve and the coil of twine thereon, is rotated by the pinion shaft 84 through an arc of 180°, whereupon the then downwardly facing surface of the loop sustaining sleeve 92 comes into contact and accurate registration with the upper circular face of the loop transfer sleeve 71. When this occurs the stripper ring 82 dwells momentarily whilst the transfer sleeve 71 moves upwardly and forces the loop sustaining sleeve 92 ahead of it and upwardly within the stripper ring 82 which, by the relative movement between the loop sustaining sleeve 92 and the stripper ring 82, transfers the loop of twine onto the upper end of the transfer sleeve 71 as the upper end thereof telescopes within the bore of the stripper ring 82. The transfer having been completed, the transfer sleeve 71 withdraws from the bore of the stripper ring 82 which immediately returns to its original position in the circular recess 81 of the base 2 and, in so doing, the loop sustaining ring 92 is forced upwardly with reference to the stripper ring 82 and is now ready to receive the second loop. The second group of teeth on the intermittent gear now engages the looper shaft pinion and causes the looper arm to make a second complete revolution around the extended end of the loop sustaining sleeve 92 and to deposit a loop of twine thereon, the looper arm coming to rest in its normal 30° position. The loop is then carried over to and transferred upon the end of the transfer sleeve 71 directly above the first loop in the same manner as before and, at the instant that this transfer is completed, plunger rod 28 drops downward through the sleeves 92 and 71 into its extreme low position, which action of the plunger rod causes the clutch to disengage and the machine to come immediately to rest after having thus formed the two loops of a clove hitch upon the end of the transfer sleeve 71. In the meantime the stripper ring 82 and loop sustaining sleeve 92 are at rest in the same position as they were at the time when the second loop transfer was effected, and swinging arm 51 will have re-positioned itself directly above the end of plunger rod 28.

The machine, having prepared the clove hitch the coils of which are being mechanically retained in definite relationship and having come to rest, is now prepared to transfer the loops to the skirt portion of a hood cap upon the mouth portion of the bottle, tighten the loops snugly to secure the hod cap and cut off the string about ½ inch beyond the eyelet. A bottle with an inverted hood cap placed upon its mouth portion is set upon the stool 22; the pedal lever is pressed downwardly, whereby the bottle is elevated, the hood cap coming into contact with the disc on the bottom end of plunger rod and the upward movement of the bottle being continued until the top end of the plunger rod impinges upon the lower end of the adjusting screw on the overhanging portion of the swinging arm 51; and the mouth portion of the bottle with the hood cap thereon is now in tying position within the transfer sleeve 71. The upward movement of the plunger rod has thrown the clutch into engagement and the cams are now rotating. The transfer sleeve 71 now moves downwardly until the lower loop of the previously formed clove hitch impinges upon the surface of the fixed stripper sleeve 70 and the continuing downward movement of the transfer sleeve entirely withdraws the upper end of the sleeve 71 from engagement with the loops, which are left free and clear for the tightening operation. The upper surfaces of the fixed stripper ring 70 and loop transfer sleeve 71 support the loops until they engage the skirt portion of the hood cap. As soon as the loops are free and clear the jaw pull lever, with the end of the string tightly held in the jaws, swings outwardly and away from the neck of the bottle and thus causes the lower loop of the hitch to contract about the skirt of the hood cap. At the same time that the lower loop of the hitch is being contracted the upper loop is being contracted, as follower arm 164 is being moved outwardly by a suitable conformation of cam 166 and thus a pulling force is exerted upon the upper portion of the twine. When these pulling forces have become sufficient to tighten the clove hitch and thus secure the contracted skirt of the hood cap upon the mouth portion of the bottle the compression of spring 179 on friction disc 177 is such as to permit the grooved fibre pulley 184 to rotate under the pulling force of the twine, against the combined frictional resistance of discs 177 and 178, to accommodate any further outward movement of follower arm 164 after the loops have been drawn to their required tightness. The twine looped around the fibre pulley is restrained from slipping around the pulley groove during the tightening of the loops by the snubbing action provided by the frictional resistance to the passage of the twine between discs 192 and 193.

As soon as the tightening of the loops has been effected the pressure of the discs upon the sides of fibre pulley 184 is removed, thus releasing the tension on the twine.

At the same time that the loops of the hitch are being contracted the open blades 121 and 122 of the scissors are elevated into their cutting position, one cutting edge on either side of the twine, and immediately after the release of the tension on the twine the end of tappet arm 125 moves downwardly, which movement causes the scissors blades to close relative to each other and thus sever the twine between the completed hitch and the eyelet upon the lower end of looper arm 137.

When the cut is completed, swinging arm 51 moves backwardly away from the upper end of plunger rod 28, which is immediately elevated to its extreme upper position in which the disc 27 clears the path of the stripper ring 82. During this upward movement of the plunger rod the stool is lowered by the action of segmental cam 24, thus withdrawing the mouth portion of the bottle from the encircling loop sustaining and transfer sleeves and from the jaws which in the meantime have opened to release the end of the twine, and the scissors blades are withdrawn downwardly to clear the return pathway of the jaw pull arm. As soon as disc 27 has cleared the pathway of stripper ring 82, the latter swings backwardly through its arcular travel to its original position in its circular depression in base 2 while, at the same time, jaws 98 in their open position swing backwardly towards the now advancing eyelet 145 to grasp the extending end of the twine as the formation of the succeeding clove hitch is started.

Obviously there are other means than those shown and described herein whereby one or more loops may be pre-formed and supported for the subsequent introduction of the mouth portion of a bottle or other container, which pre-forming and supporting may be wholly or in part automatically effected, as well as means for automatically handling the container to and from the tying mechanism and for elevating the mouth portion thereof within the pre-formed loop or loops. Variations may be provided in the means for severing the twine at one or both of the extending ends of the loops, as well as variations in the means for accomplishing the various operations or in the sequence thereof, without departing from the scope of my invention.

I claim:

1. In a method of constricting an element having flexible walls, those steps which comprise forming loops of flexible strand, transferring said loops to a transfer member, bringing said element into position for receiving the loops, transferring the loops to and about the flexible walls of said element, and constricting and securing in constricted condition the loops about said walls.

2. In a method of constricting an element having flexible walls, those steps which comprise forming a plurality of loops of flexible strand, bringing said element into position for receiving the loops, transferring the loops simultaneously upon said walls, and constricting the loops about said walls.

3. In a method of constricting and keeping constricted an element having flexible walls, those steps which comprise forming loops of flexible strand in the form of a clove hitch, bringing said element into position for receiving the loops, transferring the loops simultaneously upon said walls, and securing in constricted condition the loops about said walls.

4. In a method of constricting and keeping constricted an element having flexible walls, those steps which comprise forming and transferring to a transfer member a plurality of loops of flexible strand in the form of a clove hitch, bringing said element into position for receiving the clove hitch, transferring the clove hitch to and about the flexible walls of said element, and pulling tight the ends of the clove hitch.

5. In a method of constricting elements having flexible walls, those steps which comprise forming loops of flexible strand, transferring said loops to a transfer member, bringing one of said elements into position for receiving the loops, transferring the loops to and about the flexible walls of said one element, constricting the loop on said walls, and forming other loops for transfer on another element while said one element is being replaced by said other element in the position for receiving its loops.

6. In a method of securing a hollow element having flexible walls on a rigid object, those steps which comprise forming and transferring to a sleeve a plurality of loops of gummed twine in the form of a clove hitch, inserting into said sleeve said element with its flexible walls about the rigid object, transferring the clove hitch to and about the flexible walls of said element, and pulling tight the ends of the clove hitch so as to constrict said flexible walls and co-incidentally to secure them on the rigid object.

7. In a method of capping bottles or the like, those steps which comprise forming a loop of flexible strand, transferring said loop to a transfer member, bringing a bottle and a skirted cap into such position that the mouth portion of the bottle and the skirt of the cap are within the loop, releasing the loop from the transfer member, constricting tightly and securing in such constricted condition the loop on and about the skirt of the cap.

8. A method of securing skirted caps to bottles or the like, which method comprises forming a loop from a continuous length of flexible strand and transferring said loop to a transfer member, forming a second loop and transferring it to the transfer member so as to form with the first-mentioned loop a clove hitch, bringing a bottle having a skirted cap upon its mouth portion into position for receiving the clove hitch, transferring the clove hitch from the transfer member to and about the skirt of the cap, pulling tight the ends of the clove hitch so as to constrict the loops and co-incidentally secure the cap on the bottle, and severing the clove hitch from the remainder of the strand.

9. A method of forming a clove hitch from a continuous strand, which method comprises forming a loop, inverting said loop and transferring it to a transfer member, forming another loop, inverting and transferring the second-mentioned loop to the transfer member and transferring said clove hitch to an article.

10. A method of mechanically forming a clove hitch from a continuous length of flexible strand, which method comprises forming a loop on a loop-sustaining member, inverting said member and transferring said loop to a loop-transfer member, returning the loop-sustaining member to its original position, forming another loop thereon, inverting the loop-sustaining member and transferring the second mentioned loop to the loop-transfer member in substantial registration with and contiguous to the first mentioned loop and transferring said clove hitch to an article.

11. A machine for constricting an element having flexible walls comprising means for pre-forming loops of twine, means for bringing said element into position to receive the loops, means for moving said loops simultaneously upon said walls, and means for constricting the loops about said walls.

12. A machine for constricting and keeping constricted an element having flexible walls comprising means for pre-forming loops of twine in the form of a clove hitch, means for bringing said element into position to receive the loops, means for moving said loops simultaneously upon said walls, and means for constricting the loops about said walls.

13. A machine for forming a clove hitch from a continuous length of strand, which machine comprises mechanism for forming successive single loops of the strand and mechanism for inverting and superimposing the single loops of the continuous length of strand.

14. A machine for forming a clove hitch from a continuous length of strand, which machine comprises mechanism for intermittently forming single loops of the strand, means for supporting the clove hitch in position for ready transfer to its place of use, and mechanism for inverting and transferring each loop to said means before the formation of the next loop.

15. A machine for forming a clove hitch from a continuous length of strand, which machine comprises a device for supporting and guiding the strand, mechanism for forming successive loops of the strand which has an end portion extending from said mechanism, jaws for seizing and holding fast the extending end portion of the strand before the formation of the loops, means for supporting the clove hitch and for transferring it to its place of use, mechanism for inverting and transferring the loops to said means, means for exerting pull on the ends of the clove hitch after it has been transferred to its place of use, the last mentioned means including mechanism for moving the jaws so as to exert pull on the extending end portion of the strand and a device for tensioning that portion of the strand not formed into the clove hitch, and means for severing the clove hitch from the last-mentioned portion of the strand.

16. A bottle capping machine comprising mechanism for forming loops from a continuous length of flexible material, a loop transfer member adapted to support a loop about a cap, mechanism for transferring said loop from the first-mentioned mechanism to said member, means for releasing said loop from said member, and means for constricting said loop tightly on the cap.

17. A bottle capping machine comprising mechanism for forming a clove hitch from a continuous length of gummed twine, means for supporting the clove hitch about a cap, a device for inserting the cap and a bottle into said means and for removing the bottle after the cap has been secured thereto, means for exerting a pull on the ends of the clove hitch so as to constrict it and thus secure the cap on the bottle, and means for causing said mechanism to form another clove hitch while the capped bottle is being replaced by another bottle.

18. A machine comprising mechanism for forming a loop from a continuous length of flexible material, loop-transfer means adapted to support the loop and to transfer it to and about an element having flexible walls, means for transferring the loop from said mechanism to said means, a device for bringing said element into position for receiving the loop about its flexible walls, and means for constricting the loop on said flexible walls.

19. A machine comprising mechanism for forming a clove hitch from a continuous length of flexible material, transfer means adapted to support the clove hitch and to transfer it to and about an element having flexible walls, means for transferring the clove hitch from said mechanism to said transfer means, a device for bringing said element into position for receiving the clove hitch about its flexible walls, and means for exerting pull on the ends of the clove hitch so as to constrict it tightly on the flexible walls of said element.

20. A machine comprising apparatus for forming loops of strand and for securing them to and about elements having flexible walls, a device for feeding said elements to and removing them from said apparatus, power means for operating said apparatus, and a driving connection from said power means to said apparatus, said driving connection being controlled by said device and by the loop-forming apparatus to co-relate the operation of said device and of said apparatus.

21. A bottle capping machine comprising mechanism for intermittently forming loops from a continuous length of flexible material, loop transfer means adapted to support a loop and to transfer it to and about a cap, mechanism for transferring said loop from the first-mentioned mechanism to said means, a device for moving the cap and a bottle into position for receiving said loop and for removing the bottle after the cap has been secured thereto, means for tightening said loop on the cap to secure it to the bottle while in said position, and means for causing the first-mentioned mechanism to form another loop while the capped bottle is being replaced by another bottle.

22. A machine comprising mechanism for forming a clove hitch from a continuous length of strand, said mechanism having a loop sustaining member, transfer means adapted to support the clove hitch and to transfer it to and about an element having flexible walls, a device for bringing said element into position for receiving the clove hitch about its flexible walls and subsequently for removing said element therefrom, means for constricting the clove hitch tightly on the flexible walls of said element while in said position, means for severing the clove hitch from the remainder of the strand, and means for causing said mechanism to form another clove hitch while said element is being replaced by another element.

23. A machine comprising apparatus for tying a clove hitch about an element having flexible walls, a device for feeding said element to said apparatus and for removing it therefrom, power means for actuating said apparatus, clutch means between said power means and said apparatus, and mechanism for operating said clutch means, said mechanism being controlled by said apparatus after formation of the clove hitch and by said device when feeding the element to the apparatus to receive the clove hitch.

24. A machine for tying a clove hitch on an article, said machine comprising a transfer member, mechanism for forming a clove hitch on said member, and means for transferring the clove hitch as a unit upon the article.

25. A machine for tying a clove hitch on an article, said machine comprising a transfer member, mechanism for forming a clove hitch on said member, a device for feeding the article to said member, and means for stripping the clove hitch from said member to the article.

26. A machine comprising a transfer member, mechanism for forming successively clove hitches on said member, a device for feeding successively to said member articles each of which is adapted to receive a clove hitch as formed on said member, and means for stripping the clove hitches successively from said transfer member to said articles, said mechanism and said device being constructed and associated in such a manner that each clove hitch is formed while an article which has received a clove hitch is being replaced by the article which is next to receive a clove hitch.

27. A machine for securing a skirted hood cap about the mouth of a bottle or the like, said machine comprising a frame; loop forming mechanism mounted on the frame; a stripper sleeve carried by the frame; a transfer sleeve movably mounted in said stripper sleeve; a bottle support adapted to move the mouth of a bottle or the like, with a cap thereon, into said transfer sleeve; said loop forming mechanism including a loop sustaining member, a looper arm having an end of a strand extending therefrom and being adapted to have an orbital movement relative to said loop sustaining member, means for imparting said orbital movement to said looper arm, means for holding fast said end of the strand, and means for transferring loops from said loop sustaining member to said transfer sleeve; and means for moving said transfer sleeve relative to said stripper sleeve to transfer loops to bottle caps or the like.

28. A machine for securing a skirted hood cap about the mouth of a bottle or the like, said machine comprising a frame; loop forming mechanism mounted on the frame and adapted to form loops from a continuous length of strand and to arrange loops in the form of clove hitches; a stripper sleeve carried by the frame; a transfer sleeve slidably mounted in said stripper sleeve; a bottle support adapted to move the mouth of a bottle, with a cap thereon, into and out of said transfer sleeve; said loop forming mechanism including a loop sustaining member, a looper arm having an end portion of the strand extending therefrom and being adapted to have an orbital movement relative to said loop sustaining member, jaws adapted to grip said end portion of the strand, means for imparting said orbital movement to said looper arm to loop said strand about said loop sustaining member, and means for inverting said loop sustaining member and for transferring loops successively formed thereon to said transfer sleeve so as to form clove hitches; means for shifting said transfer sleeve relative to said stripper sleeve to transfer a clove hitch to said cap; means for moving said jaws to contract the clove hitch on the cap; and means for severing the contracted clove hitch from the continuous strand.

29. A machine comprising a frame; a stripper sleeve carried by the frame; a transfer sleeve slidably mounted in said stripper sleeve; a bottle support adapted to move the mouth of a bottle, with a skirted hood cap thereon, into and out of said transfer sleeve; a loop sustaining member; a looper arm having a portion of a strand extending therefrom and being adapted to have an orbital movement relative to said loop sustaining member; jaws adapted to grip and hold fast said portion of the strand; mechanism adapted to impart said orbital movement to said looper arm and thereby to deposit a loop on said loop sustaining member, to invert said loop sustaining member, to transfer said loop to said transfer sleeve, to return said loop sustaining member to its initial position, to deposit a second loop on said loop sustaining member, again to invert said loop sustaining member, and to transfer the second loop to said transfer sleeve, all whereby a clove hitch is formed on said transfer sleeve; means for shifting said transfer sleeve relative to said stripper sleeve to transfer the clove hitch to said cap; and means for moving said jaws to contract the clove hitch on said cap.

30. A method of capping bottles or the like, which method comprises forming a clove hitch from a continuous length of gummed twine, transferring said clove hitch to a transfer sleeve, inserting into said sleeve the mouth portion of a bottle having a skirted cap thereon, pulling the ends of the clove hitch tight, severing the clove hitch from the remainder of the twine, withdrawing the capped bottle from said sleeve, and forming another clove hitch while the capped bottle is being replaced by another bottle and cap.

31. A method of constricting elements having flexible walls, which method comprises forming a loop from a continuous length of strand, forming a second loop and superimposing it in inverted position upon the first-mentioned loop whereby a clove hitch is formed, transferring the clove hitch to an element having flexible walls, pulling tight the ends of the clove hitch about said flexible walls, and forming another clove hitch while the constricted element is being replaced by another element.

JOSEPH H. RAMSEY.